United States Patent
Kolaian

[15] 3,691,155
[45] Sept. 12, 1972

[54] HEAT TREATMENT OF OXIDIZED STARCH

[72] Inventor: Jack H. Kolaian, c/o Texaco Inc., P.O. Box 509, Beacon, N.Y. 12508

[22] Filed: Dec. 28, 1970

[21] Appl. No.: 102,165

Related U.S. Application Data

[62] Division of Ser. No. 837,887, June 3, 1969, Pat. No. 3,637,493.

[52] U.S. Cl. ........260/233.3 R, 252/8.5 C, 260/233.5
[51] Int. Cl. .................................................C08b 19/04
[58] Field of Search........260/233.3, 233.5; 252/8.5 C

[56] References Cited

UNITED STATES PATENTS

| | | | |
|---|---|---|---|
| 3,417,017 | 12/1968 | Kolaian | 252/8.5 |
| 3,493,561 | 2/1970 | Kolaian et al. | 260/233.3 |
| 3,314,883 | 4/1967 | Walker | 252/8.5 |

*Primary Examiner*—Donald E. Czaja
*Assistant Examiner*—M. I. Marquis
*Attorney*—K. E. Kavanagh and Thomas H. Whalley

[57] ABSTRACT

A chemically oxidized starch drilling fluid dispersant having improved resistance to deterioration in the presence of bacteria in a low pH mud system by heating a chemically oxidized starch dispersant for 15 to 50 minutes at temperatures of 400°–475°F. and an aqueous drilling fluid containing the heated chemically oxidized starch dispersant.

4 Claims, No Drawings

3,691,155

HEAT TREATMENT OF OXIDIZED STARCH

This application is a divisional application of application Ser. No. 837,887 filed June 30, 1969, now U.S. Pat. No. 3,637,493.

The present invention relates to an improved drilling fluid dispersant, an aqueous drilling fluid containing the improved dispersant and an improved drilling fluid additive composition.

In commonly assigned U.S. Pat. No. 3,417,017, issued Dec. 17, 1968, there is disclosed and claimed an aqueous drilling fluid containing a chemically oxidized starch dispersant produced by oxidizing starch with a water soluble inorganic oxidizing agent in an aqueous acidic reaction medium at about 75°–150°F. for about 2–75 minutes and drying the resultant oxidized starch dispersant. In commonly assigned, copending application Ser. No. 741,214, filed June 28, 1968, now U.S. Pat. No. 3,493,561 there is disclosed and claimed the method of making the oxidized starch dispersant by oxidizing starch with a water soluble inorganic oxidizing agent in an aqueous acidic reaction medium at about 75°–150b°F. for about 2–75 minutes and drying the resultant oxidized starch product.

A disadvantage of this chemically oxidized starch product as a dispersant in a low pH mud system is its susceptibility to attack by bacteria with the result that an objectionable, sour odor is emitted from the mud. Further the dispersing properties of the starch product are not outstanding in such low pH mud systems. It is known that the addition of a starch preservative such as formaldehyde in amounts of the order of about one-sixth pound per barrel of drilling fluid to a drilling fluid will prevent or inhibit the development of offensive odors therein due to deterioration of the starch component by bacteria attack.

It has now been found that this oxidized starch dispersant can be improved with respect to its susceptibility to deterioration in the presence of bacteria with a resultant inhibition of the objectionable sour odor in a low pH mud system by subjecting the dried oxidized starch dispersant to further heating for a period of from about 15 to 45 minutes at temperatures between about 400° and 475°F. with agitation.

Exposure of the dried chemically oxidized starch dispersant to these relatively high temperatures for the indicated time periods does not adversely effect the dispersing properties of the material in low pH mud systems. Surprisingly, such heat treatment improves the dispersing properties of the resulting heat treated starch product in shale control mud systems. This is in contrast to the adverse effects on its dispersing properties in both mud systems if the oxidized starch is subjected to such high temperatures in the initial drying step for periods over about 5 minutes.

In the method of the present invention the use of heating temperatures above about 475°F. has an adverse effect on the dispersing properties of the material while temperatures below about 400°F. do not produce the desired result in terms of making the starch product resistant to bacterial attack while maintaining satisfactory dispersing properties. Similarly, time periods above about 50 minutes and below about 15 minutes do not produce the desired results.

The chemically oxidized starch dispersant used as the starting material in the present invention is more fully described and claimed in applicant's copending application Ser. No. 741,214, filed June 28, 1968, now U.S. Pat. No. 3,493,561 and is hereby incorporated herein by reference. Applicant's U.S. Pat. No. 3,417,017, issued Dec. 17, 1968, discloses and claims use of the oxidized starch dispersant in aqueous drilling fluids and as a drilling fluid additive. The disclosure of said Patent is also expressly incorporated herein by reference.

Following is a description by way of example of a method of carrying out the present invention.

COMPARATIVE EXAMPLE A

Argo brand, food grade, corn starch in an amount of 20 grams was slurried with 38 milliliters of an aqueous 0.5M nitric acid solution and heated to a temperature of 120°F. There was added to the heated slurry 13 milliliters of an aqueous 0.2 M sodium dichromate solution and mixing was continued. The temperature of the resulting mixture was increased to about 140°–150°F. and maintained at this temperature for about 30 minutes. The crude reaction product was removed from the reaction vessel by pouring the contents onto a steel plate heated in a forced air drying oven to form thereon a relatively thin layer of about one-eighth inch or less in height of the oxidized starch product. The heated steel plate now containing the crude reaction product was then heated additionally for about 5 minutes at an oven temperature of 300°–325°F. The plate containing the dried reaction product was removed from the oven, allowed to cool to room temperature and the reaction product removed therefrom. The reaction product was pulverized and there was obtained a light green colored powder. The product yield was about 100 percent on a dry starch basis.

The starch product of this example was found to be susceptible to attack by bacteria when employed as a dispersant in a low pH mud system. The mud system was a top hole base mud obtained from West Cote Blanche Bay area having the following properties was used as the initial mud in all cases: $V_{600}$ 53, $V_{300}$ 39, PV 14, YP 25, AV 26, Gels at 0 and 10 minutes, 7 and 18, respectively, pH 9.0, API Water Loss (30 min.) 13.0.

EXAMPLES 1–4

In each of these examples, a portion of the chemically oxidized starch dispersant of Comparative Example A was heated for a prescribed time period with agitation by stirring at a prescribed temperature. Thereafter the resulting treated starch dispersants were incorporated in a low pH drilling fluid in an amount of 3.5 pounds per barrel plus 1.9 pounds per barrel of sodium hydroxide. The mud was aged overnight in an oven at 140°F., before testing. The odor tests were after about 3 days time. The properties of the drilling fluid were determined. The heating times, temperature and odor test results are tabulated below in Table 1.

TABLE 1

|  | Time, mins. | Temp., °F. | After 3 days Odor Test |
|---|---|---|---|
| Comparative Example A | — | — | Sour |
| Ex. 1 | 15 | 400 | None |
| 2 | 15 | 450 | None |

| | | | |
|---|---|---|---|
| 3 | 15 | 500 | None |
| 4 | 60 | 400 | None |

Inspection of the results in Table 1 above shows that heating the chemically oxidized starch dispersant of Comparative Example A for 15–60 minutes at 400°–450°F., Examples 1, 2, and 4 results in a product that does not sour in a low pH mud system. The product of Comparative Example A, no heating after drying, resulted in a sour odor from the low pH mud. The product of Example 3, heated for 15 minutes at 500°F., outside the range of the invention, also produces a non-souring product in a low pH mud but is unsatisfactory since the dispersing properties of the material are destroyed by such treatment. Table 2 below shows this adverse effect. Similarly the product of Example 4, heated for 60 minutes at 400°F., is classified as not acceptable because its dispersing properties in a shale control mud system are not satisfactory. Table 2 shows these poor mud test data.

In Table 2 below the shale control mud was prepared by adding to the base mud, 3.5 pounds of the particular dispersant 0.3 pound of sodium hydroxide, 0.3 pound of lime and 3.0 pounds of calcium chloride per barrel. The mud was aged overnight in an oven at 140°F.

TABLE 2

| Dispersant amount, lbs./bbl. | Time, mins. | Temp., °F. | Low pH mud | | | | | Shale control mud | | | | |
|---|---|---|---|---|---|---|---|---|---|---|---|---|
| | | | P.V. | Y.P. | Ap. visc., cpe. | Shearometer gels, lbs./100 ft.$^2$ | | P.V. | Y.P. | Ap. visc., cpe. | Shearometer gels, lbs./100 ft.$^2$ | |
| | | | | | | 0 min. | 10 min. | | | | 0 min. | 10 min. |
| Control Ex. A ..... 7 | | | 12 | 0 | 12 | 0$^l$ | 0$^l$ | | | | | |
| Control Ex. A ..... 3.5 | | | | | | | | 26 | 0 | 26 | 0$^l$ | 0$^l$ |
| Ex. 1 ............. 7 | 15 | 400 | 13 | 0 | 13 | 0$^l$ | 0$^l$ | | | | | |
| Ex. 1 ............. 3.5 | 15 | 400 | | | | | | 25 | 0 | 23 | 0$^l$ | 0$^l$ |
| Ex. 2 ............. 7 | 15 | 450 | 14 | 0 | 14 | 0$^l$ | 0$^l$ | | | | | |
| Ex. 2 ............. 3.5 | 15 | 450 | | | | | | 18 | 2 | 19 | 0$^l$ | 0$^o$ |
| Ex. 3 ............. 7 | 15 | 500 | 21 | 15 | 28.5 | 0$^l$ | 3.5 | | | | | |
| Ex. 3 ............. 3.5 | 15 | 500 | | | | | | 10 | 70 | 45 | 9 | 18 |
| Ex. 4 ............. 7 | 60 | 400 | 14 | 1 | 14.5 | 0$^l$ | 0$^l$ | | | | | |
| Ex. 4 ............. 3.5 | 60 | 400 | | | | | | 22 | 6 | 25 | 0$^l$ | 0$^{25}$ |

Inspection of the data in this Table 2 shows that the dispersing properties of the products of Examples 1 and 2 are improved by the heat treatment method of the present invention as evidenced by the respective Gel Strength data. A comparison of the Yield Point and Gel Strength values of these examples with the values obtained using the product of Comparative Example A show that the 10 minute Gel Strengths are considerably lower, indicating more effective dispersing effects. The high Yield Point and Gel Strength data for the product of Example 3 show that a heating temperature of 500°F. results in a deterioration of the products dispersing properties in both mud systems.

The data shown for Example 4 show that for a heating time of 60 minutes at 400°F., some deterioration in dispersing properties results in the shale control mud as evidenced by the increase in Yield Point and 10 minute Gel Strength values.

Obviously, many modifications and variations of the invention as hereinbefore set forth may be made without departing from the spirit and scope thereof, and therefore, only such limitations should be imposed as are indicated in the appended claims.

I claim:

1. A method of improving the resistance of a dried, chemically oxidized starch drilling fluid dispersant to deterioration by bacteria attack in a low pH drilling fluid, which comprises subjecting said dried, chemically oxidized starch drilling fluid dispersant to a further heating step at a temperature in the range of from about 400° to 475° F. for a period of from 15 to 50 minutes, said dried chemically oxidized starch dispersant having been prepared by oxidizing starch with a water soluble inorganic oxidizing agent selected from the group consisting of permanganates, chromates, dichromates, chlorates, chlorites, hypochlorites, bromates, hypobromites, peroxides, peroxodisulfates, hypochlorous acid and peroxodisulfuric acid which is present in an amount of from about 0.04 to about 0.5 gram atom of available oxygen per 100 grams of starch reactant in an aqueous acidic reaction medium selected from the group consisting of nitric acid, hydrochloric acid, sulfuric acid, acetic acid, propionic acid, benzenesulfonic acid and toluenesulfonic acid wherein the acid reactant is present in an amount of from about 4.5 to about 220 percent by weight per part by weight of starch at a temperature in the range of from about 75° F. to about 150° F. and below the gel temperature of the starch in the reaction medium for a period of time between about 2 minutes and about 75 minutes and sufficient to oxidize said starch material and drying the resulting oxidized starch drilling fluid dispersant at an elevated temperature.

2. Method as claimed in claim 1 wherein the dried, chemically oxidized starch drilling fluid dispersant is heated at a temperature in the range of from about 400°F. to about 450°F. for a period of from 15 to about 30 minutes.

3. Method as claimed in claim 1 wherein said dried chemically oxidized starch drilling fluid dispersant is neutralized with an alkaline reagent to a pH in the range of from about 4 to 7 before drying.

4. Method as claimed in claim 1, wherein the dried, chemically oxidized starch drilling fluid dispersant has a water content of from about 3 to 6 percent by weight.

* * * * *